US006802451B2

(12) United States Patent
Yavid et al.

(10) Patent No.: US 6,802,451 B2
(45) Date of Patent: Oct. 12, 2004

(54) SCANNING ACTUATOR ASSEMBLY FOR IMAGE PROJECTION MODULES, ESPECIALLY IN PORTABLE INSTRUMENTS

(75) Inventors: Dmitriy Yavid, Stony Brook, NY (US); Frederick R. Wood, Medford, NY (US); Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 58 days.

(21) Appl. No.: 10/215,330

(22) Filed: Aug. 7, 2002

(65) Prior Publication Data

US 2004/0026514 A1 Feb. 12, 2004

(51) Int. Cl.⁷ .................................................. G06K 7/10
(52) U.S. Cl. .............................. 235/472.01; 235/462.45
(58) Field of Search ........................... 235/454, 462.01, 235/462.36, 462.45, 472.01, 472.03

(56) References Cited

U.S. PATENT DOCUMENTS

| 5,866,894 A | * | 2/1999 | Bard et al. ............. 235/462.01 |
| 6,360,949 B1 | * | 3/2002 | Shepard et al. ........ 235/462.43 |
| 2002/0125324 A1 | * | 9/2002 | Yavid et al. ........... 235/462.45 |

* cited by examiner

Primary Examiner—Thien M. Le
Assistant Examiner—April Taylor
(74) Attorney, Agent, or Firm—Kirschstein, et al.

(57) ABSTRACT

An apparatus and actuator assembly for and method of projecting an image on a viewing surface either attached to the apparatus, or on a distant surface, includes sweeping a light beam along a plurality of scan lines that extend over the viewing surface, and selectively illuminating parts of the image at selected positions of the light beam on the scan lines. The viewing surface can be selected by the user by moving a panel on the housing, thereby allowing the user either option for display.

8 Claims, 7 Drawing Sheets

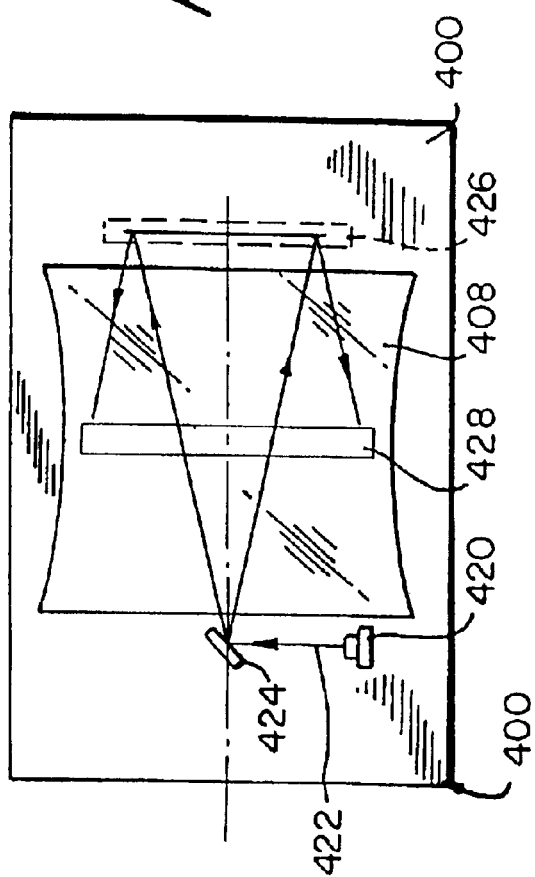
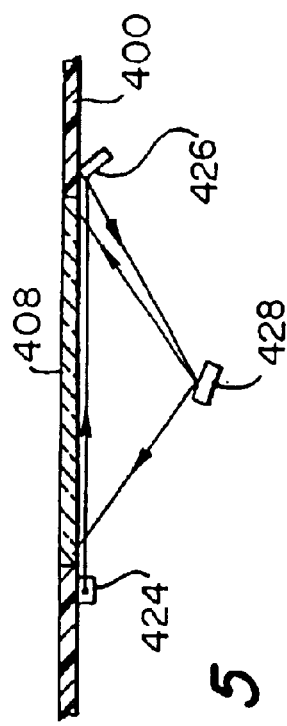

SCANNING ACTUATOR ASSEMBLY FOR IMAGE PROJECTION MODULES, ESPECIALLY IN PORTABLE INSTRUMENTS

This application is related to pending U.S. patent application Ser. No. 10/090,653, filed Mar. 4, 2002.

This application is related to pending U.S. patent application Ser. No. 09/604,197, filed Jun. 27, 2000, which is a continuation-in-part of U.S. patent application Ser. No. 09/604,196, filed Jun. 27, 2000 which is a continuation-in-part of U.S. patent application Ser. No. 09/227,245, filed Jan. 8, 1999, which is a continuation-in-part of U.S. patent application Ser. No. 08/794,782, filed Feb. 13, 1997, now U.S. Pat. No. 6,119,944.

This application is also related to pending U.S. patent application Ser. No. 09/706,112, filed Nov. 3, 2000, which is a continuation of U.S. patent application Ser. No. 09/176,064, filed Oct. 20, 1998, which is a continuation of U.S. patent application Ser. No. 08/037,749, filed Mar. 26, 1993, now U.S. Pat. No. 5,825,402.

BACKGROUND OF THE INVENTION

1. Field of the Invention

The present invention generally relates to a scanning assembly for use in image projection modules, especially in a portable instrument for projecting an image by controlling a light beam using components typically employed in readers for electro-optically reading indicia, such as a bar code symbol, a signature, or an image.

2. Description of the Related Art

Various optical scanning systems and readers have been developed heretofore for reading indicia such as bar code symbols appearing on a label or on the surface of an article. The bar code symbol itself is a pattern of graphic indicia comprised of a series of bars of various widths spaced apart from one another to bound spaces of various widths, the bars and spaces having different light reflecting characteristics. The readers function by electro-optically transforming the spatial pattern represented by the graphic indicia into a time-varying electrical signal which is, in turn, decoded into data which represent the information or characters encoded in the indicia that are intended to be descriptive of the article or some characteristic thereof. Such data is typically represented in digital form and utilized as an input to a data processing system for applications in point-of-sale processing, inventory control, distribution, transportation and logistics, and the like.

A variety of scanning systems and readers is known. The scanner could be a wand type reader, such as shown in U.S. Pat. No. 5,508,504, herein incorporated by reference, including an emitter and a detector fixedly mounted in a wand, in which case a user holds and manually moves the wand across the symbol. As the wand passes over the bar code symbol, the emitter and associated optics produce a light spot on the symbol, and the detector senses the light reflected back from the symbol as the light spot passes over the bars and spaces of the symbol.

To decode a bar code symbol and extract a legitimate message, a bar code reader illuminates the symbol and senses the light reflected therefrom to detect the widths of the bars and the spaces and produces an electrical signal corresponding to the scanned symbol. This electrical signal is decoded to provide multiple alphanumerical characters which are descriptive of the article to which the symbol is attached or to some characteristic thereof.

U.S. Pat. No. 4,471,218 discloses a data wand and a data well, and is incorporated herein by reference. According to this patent, a wand-type data entry terminal is entirely self-contained and cordless, and includes reading and storage circuitry. The terminal further allows downloading of data using an optically coupled link. Preferably, the stored data is output using a pulsed beam from the reading beam light source. The output beam is detected by an optical detector and decoded appropriately.

The disclosures of the above mentioned patents are incorporated herein by reference. The general features of construction and operation of a wand-type reader will be apparent to the skilled reader.

According to another system described in U.S. patent application Ser. No. 08/691,263, filed Aug. 2, 1996, commonly assigned herewith, a hand-held optical reader terminal is provided having an ergonomic design. According to that system, there is provided, inter alia, a hand-held optical reader arranged to fit in the hand of a user and including a reader component and a downloading component. The device can include a display screen for displaying control messages or video images, a keypad for inputting control or other data, and a wireless communication link for downloading data read by the reader component to an external device. The system can further include a plurality of interchangeable data collection modules connectable to the main body of the device, each module fulfilling a different function such as image/video capture, audio capture and so forth. As a result, a simple multi-media module is provided.

It is desired, however, to arrive at a lightweight hand-held data reader having a yet wider range of capabilities. In view of the relative simplicity, availability and adaptability of information systems including bar code symbol data storage capability, it is desirable to develop systems particularly suitable for consumer applications.

Alternatively, an optical moving spot scanner sweeps a light beam, such as a laser beam, across the symbol; and a detector senses reflected light from the beam spot swept across the symbol. In each case, the detector produces an analog scan signal representing the encoded information.

Moving spot scanners of this general type have been disclosed, for example, in U.S. Pat. No. 4,387,297; No. 4,409,470; No. 4,760,248; No. 4,896,026; No. 5,015,833; No. 5,262,627; No. 5,504,316 and No. 5,625,483, all of which have been assigned to the same assignee as the instant application and each of which is hereby incorporated by reference. Also incorporated by reference herein are U.S. patent application Ser. No. 09/065,867, filed Apr. 24, 1998, and U.S. patent application Ser. No. 08/353,682, filed Dec. 9, 1994, both of which have been assigned to the same assignee as the instant application. As disclosed in some of the above patents, one embodiment of such a scanning system resides, inter alia, in a hand-held, portable laser scanning device supported-by a user, which is configured to allow the user to aim the scanning head of the device, and more particularly, a light beam, at a targeted symbol to be read.

The light source in a laser scanner bar code reader is typically a semiconductor laser. The use of semiconductor devices as the light source is especially desirable because of their small size, low cost and low voltage requirements. The laser beam is optically modified, typically by an optical assembly, to form a beam spot of a certain size at a target distance. It is often preferred that the cross-section of the beam spot measured in the scanning direction at the target distance be approximately the same as the minimum width in the scanning direction between regions of different light reflectivity, i.e., the bars and spaces of the symbol. Although typical readers utilize a single laser source, other bar code readers have been proposed with two or more light sources of different characteristics, e.g., different frequencies.

In the laser beam scanning systems known in the art, a single laser light beam is directed by a lens or other optical components along a light path toward a bar code symbol on a surface. The moving-beam scanner operates by repetitively scanning the light beam in a line or series of lines across the symbol by means of motion of a scanning component, such as the light source itself or a mirror disposed in the path of the light beam. The scanning component may either sweep the beam spot across the symbol and trace a scan line across the pattern of the symbol, or scan a field of view of a photodetector, or do both. The laser beam may be moved by optical or opto-mechanical means to produce a scanning light beam. Such action may be performed by either deflecting the beam (such as by a moving optical element, such as a mirror) or moving the light source itself. U.S. Pat. No. 5,486,944 describes a scanning module in which a mirror is mounted on a flex element for reciprocal oscillation by electromagnetic actuation. U.S. Pat. No. 5,144,120 to Krichever, et al., describes laser, optical and sensor components mounted on a drive for repetitive reciprocating motion either about an axis or in a plane to effect scanning of the laser beam.

Because of the size and optical and electronic complexity of scanning systems and bar code readers, they generally have heretofore not been combined with other devices in the same housing. The conventional use of a liquid crystal display (LCD) with an adequate viewing size on such readers occupies a large physical area and limits any proposed reduction in size for a hand-held system. The display image is displayed in a single color.

Also known in the art, for example, in U.S. Pat. No. 5,617,304, is a laser pointer which is a device that projects a monochromatic spot of light on a target, such as a presentation being made by a lecturer to an audience. The pointer is essentially a flashlight-type device and is usually packaged in a tubular housing.

Scanning systems for writing or printing indicia have been disclosed, for example, in U.S. Pat. No. 4,085,423 and No. 4,908,813. The use of thermally sensitive paper, or utilizing dyes which are sensitive to radiation in a particular frequency spectrum, is known for use in printing systems, such as exemplified in U.S. Pat. No. 5,014,072.

SUMMARY OF THE INVENTION

OBJECTS OF THE INVENTION

Accordingly, it is a general object of this invention to provide a laser scanning module, especially of miniature size, for scanning a beam and projecting an image on at least two different viewing surfaces.

More particularly, it is an object of the present invention to provide a projection module for use in a compact unit as a display alternative to liquid crystal display devices, especially for use in hand-held instruments.

It is yet another object of the present invention to display humran-readable information, especially alphanumerical characters, selectably on or remotely from a portable instrument.

A concomitant object of the present invention is to provide an image projector that consumes little electrical power.

SUMMARY OF THE INVENTION

In keeping with the above objects and others which will become apparent hereafter, one feature of the present invention generally relates to an arrangement for displaying an image for viewing by a human eye, comprising: a housing having a screen which has a rear surface; an energizable laser supported by the housing for projecting a laser beam toward the rear surface of the screen when energized, a scanner supported by the housing for sweeping the laser beam along a plurality of light paths either over the rear surface of the screen, or to a remote surface; and a controller supported by the housing and operatively connected to, and operative for energizing, the laser at selected positions of the laser beam in at least one of the light paths to generate individual light pixels at the selected positions, and at a refresh rate at which the pixels persist to enable to eye to steadily view the image comprised of a light pattern of the pixels on the screen.

The invention further relates to a user-supported, personal pocket appliance for displaying information, comprising: a housing having a display panel; an energizable laser in the housing for projecting a laser beam toward the display panel when energized; a scanner in the housing for sweeping the laser beam along a plurality of light paths either over a surface of the display panel, or to a remote surface; and a controller in the housing operatively connected to, and operative for energizing, the laser at selected positions of the laser beam in at least one of the light paths to generate individual light pixels at the selected positions on the display panel or remote surface, and at a refresh rate at which the pixels persist to enable a human eye to steadily view the image comprised of a light pattern of the pixels on the surface of the display panel or remote surface.

The invention further relates to a scanning component for scanning a light beam, comprising: a movable scan mirror for reflecting the light beam; a magnetizable member mounted to the scan mirror for joint movement therewith; a magnetic structure adjacent the magnetizable member for inducing a static magnetic field, and for magnetizing the magnetizable member; and an actuatable electromagnetic drive for creating a variable magnetic field that interacts with the static field for exerting a force upon the member and for moving the member and the scan mirror so as to scan the light beam across a target.

Preferably, the controller is operative for energizing and de-energizing the laser as the light beam is swept along said at least one of the light paths. The assembly may include additional lasers or light sources for generating additional light beams, all of the light beams having different or the same wavelengths.

The scanning component further includes a first scan mirror for sweeping the light beam along a first direction along said at least one of the light paths, and a second scan mirror for sweeping the light beam along a second direction generally orthogonal to the first direction. The controller is operative for energizing and de-energizing the light source as the light beam is swept along a plurality of each of the light paths.

In a preferred embodiment, the housing has a light-transmissive element through which the swept light beam is directed toward the viewing surface. The housing preferably has a size and a shape configured to be held in a user's hand like a personal digital assistant, or can be mounted around one's wrist like a watch, or the housing may be elongated and extend between opposite end regions in a pen-like configuration. The panel may be mounted on the housing for movement to a display position in which the swept light beam is incident on a surface of the panel, or to a projection position in which the beam is directed to an external remote surface.

In another example, the screen preferably has an optically diffusive property and is movable to a deployed position in which the swept light beam is incident on the rear surface of the screen and is diffused through the screen to render the image visible on a front surface of the screen. It is also desirable if the screen has a wavelength filtering function to suppress ambient light and increase display contrast.

It is especially advantageous if the first scan mirror is moved at a first rate of speed through a first angular distance, and if the second scan mirror is moved at a second rate of speed slower than said first speed, and through a second angular distance greater than said first angular distance. Also, it is beneficial if the assembly includes a fold mirror in an optical path of the light beam between the first and second scan mirrors.

In accordance with this invention, the controller is operatively connected to a memory having stored fonts and timing data as to when to energize and de-energize the assembly to display the image as font characters. The image is preferably a human-readable message.

A method of projecting and displaying an image using the scan element according to the present invention also forms part of this invention. The method includes the step of (a) generating visible parts of the image by directing a visible light beam toward a viewing surface, and by sweeping the light beam along a plurality of scan lines that extend over the viewing surface; and the step of (b) generating non-visible parts of the image by preventing the directing step at selected positions of the light beam on at least one of the scan lines. Step (a) is performed by energizing a light source, and step (b) is performed by de-energizing the light source. The sweeping step is performed by sweeping the light beam along two mutually orthogonal directions. Step (a) may be performed by energizing a plurality of light sources, and step (b) may be performed by de-energizing the plurality of light sources.

It is also preferable if step (a) and step (b) are performed in a housing having a light-transmissive element through which the swept light beam is directed. Step (a) is performed either by directing the swept light beam at a surface of a panel mounted on the housing, or by directing the swept light beam at a rear surface of a diffusive screen mounted on the housing.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a top plan view of the rear projector of FIG. 1;

FIG. 5 is a broken-away side view of the rear projector of FIG. 4;

DETAILED DESCRIPTION OF THE PREFERRED EMBODIMENTS

As used in this specification and in the appended claims, the term "indicia" broadly encompasses not only symbol patterns composed of alternating bars and spaces of various widths commonly referred to as bar code symbols, but also one or two dimensional graphic patterns, such as signatures as well as alphanumerical characters. In general, the term "indicia" may apply to any type of pattern or information which may be recognized or identified by scanning a light beam and/or a field of view of a photodetector, and detecting reflected or scattered light as a representation of variations in light reflectivity at various points of the pattern or information. A bar code symbol is one example of an "indicia" which the present invention can scan.

Figure 1:
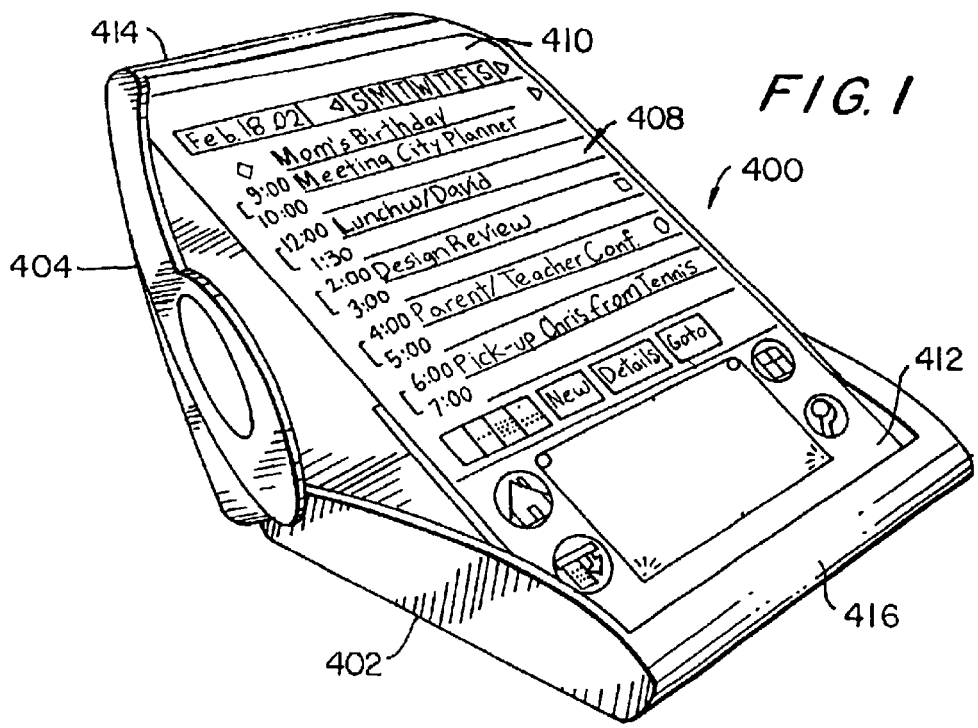
FIG. 1 is a perspective view of a portable instrument having a rear projector.
Figure 2:
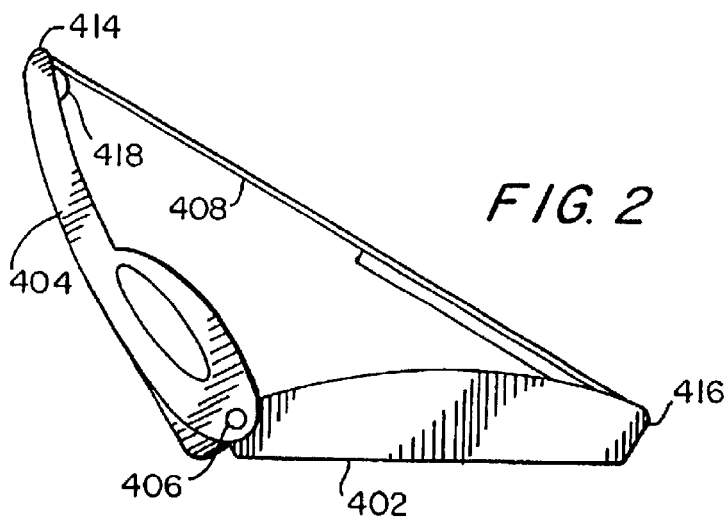
FIG. 2 is a side view of the instrument of FIG. 1.
Figure 3:
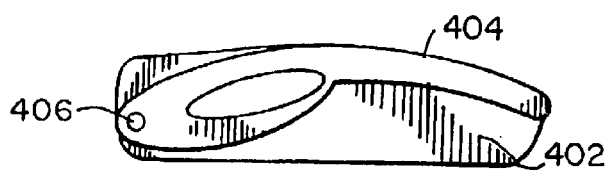
FIG. 3 is a side view of the instrument of FIG. 1 in a closed position.

FIGS. 1–3 depict a portable instrument 400 and an electro-optical assembly for projecting an image on a screen from behind the screen of the instrument. Instrument 400 may serve as a personal digital assistant or portable computer and includes a folding, clamshell housing having housing parts 402, 404 pivotably connected at pivot 406 for movement between an open position depicted in FIG. 2 and a closed position depicted in FIG. 3. A flexible screen 408 extends across the housing parts in the open position. The screen has a diffusive optical property and blocks ambient light. The screen may be anchored at its upper and lower ends 410, 412 to outer edge regions 414, 416 of the housing parts, in which case, the screen folds in half in the closed position. Alternatively, the screen may be rolled about a roller 418, and the lower end 412 pulled to unroll the screen prior to latching the lower end 412 to the outer edge region 416 where, as illustrated in FIG. 1, the screen is held taut in the open position.

FIG. 4 depicts an electro-optical assembly or module for projecting an image onto a rear surface of the screen 408. A laser 420 in the instrument 400 directs a laser beam 422 to an X-scan movable mirror 424 for reflection therefrom to a stationary bounce mirror 426 for reflection therefrom to a Y-scan movable mirror 428 for reflection therefrom to the rear surface of the screen 408. The two-dimensional scan on the rear surface diffuses through the screen to the front surface for viewing. If the laser beam is modulated, dark and bright spots of light comprise a raster image.

In the preferred embodiment, the X-scan mirror is driven at a high frequency (above 10 kHz) and over a narrow scan angle (7.2° mechanical), and is preferably a micromachined miniature mirror, but could be a mirrored polygon. The laser may be energized only when the X-scan mirror is moving in one direction, and deenergized when the X-scan mirror is moved in an opposite direction. The Y-scan mirror is driven at a low frequency (about, 50 Hz) and over a wide scan angle (28.5° mechanical) and is larger than the X-scan mirror. The bounce mirror between the X-scan and Y-scan mirrors enables the scan angle of the X-scan mirror to be reduced without increasing the overall depth of the assembly. The screen size is about 4 square inches. The screen resolution is about 160×160 pixels. The screen is viewable 90° in all viewing directions in contrast to LCD viewing angles which typically are limited to 30°. The electro-optical assembly of FIG. 5 can occupy a spatial volume of 12 mm×10 mm×8 mm. The display of this invention may utilize the same interface as an LCD display.

Figure 6:
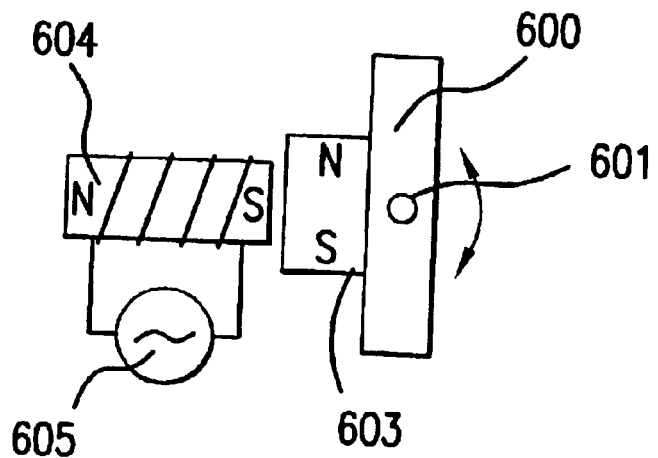
FIG. 6 is a schematic view of a scanning component according to the prior art.
Figure 7:
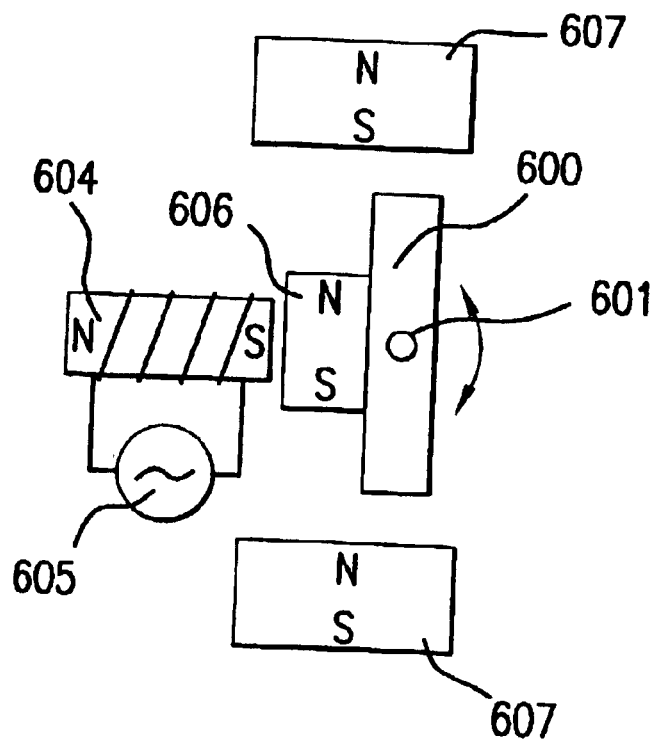
FIG. 7 is a schematic view of a scanning component according to this invention.

A scanning component of particular utility is illustrated in FIGS. 6 and 7. A soft magnetic material does not retain its magnetization and is easily demagnetized. Substituting a piece of soft magnetic material for a permanent magnet can reduce cost and improve the performance and reliability of miniature permanent magnet scanning components. It also makes possible to use magnetic actuation for micro-electromechanical (MEMS) devices used in scanning components.

FIG. 6 shows a common design known in the prior art of a magnetically actuated scan element, where a mirror 600 is mounted on a hinge 601 and has a permanent magnet 603 attached to it. When an electromagnetic drive coil 604 is energized from an AC source 605, the coil creates an alternating magnetic field around the permanent magnetic field of the magnet, which forces the magnet 603 and the mirror 600 to jointly oscillate.

FIG. 7 shows the same scan element with a piece of the soft magnetic material (steel, iron, nickel, cobalt, ferrite, etc.) 606 in place of the permanent magnet. The soft material 606 does not possess any residual magnetization. Nevertheless, the soft material 606 becomes magnetized when placed in the static magnetic field created by the two permanent magnets 607 spaced apart from each other. The soft material 606 reacts to the alternating magnetic field of the coil 604 in the same way that the permanent magnet 603 did.

The advantages of using soft magnets over permanent magnets are:

1. Soft magnetic materials can be deposited by various high-yield methods, while permanent magnets can only be prefabricated and then attached to the scan element. This is more expensive and less precise, if the magnet is very small. This is especially important for micro-machined scan elements, since currently no reliable method of fabricating a permanent magnet on a MEMS device is available.
2. High performance permanent magnets may demagnetize when cut into sub-millimeter pieces. They are also very sensitive to elevated temperatures.
3. Saturation inductance of the best soft magnets exceeds residual inductance of the best permanent magnets by a factor of about 1.5. Hence, a scan element with a soft magnet can generate higher torque or consume less power.

Figure 8A:
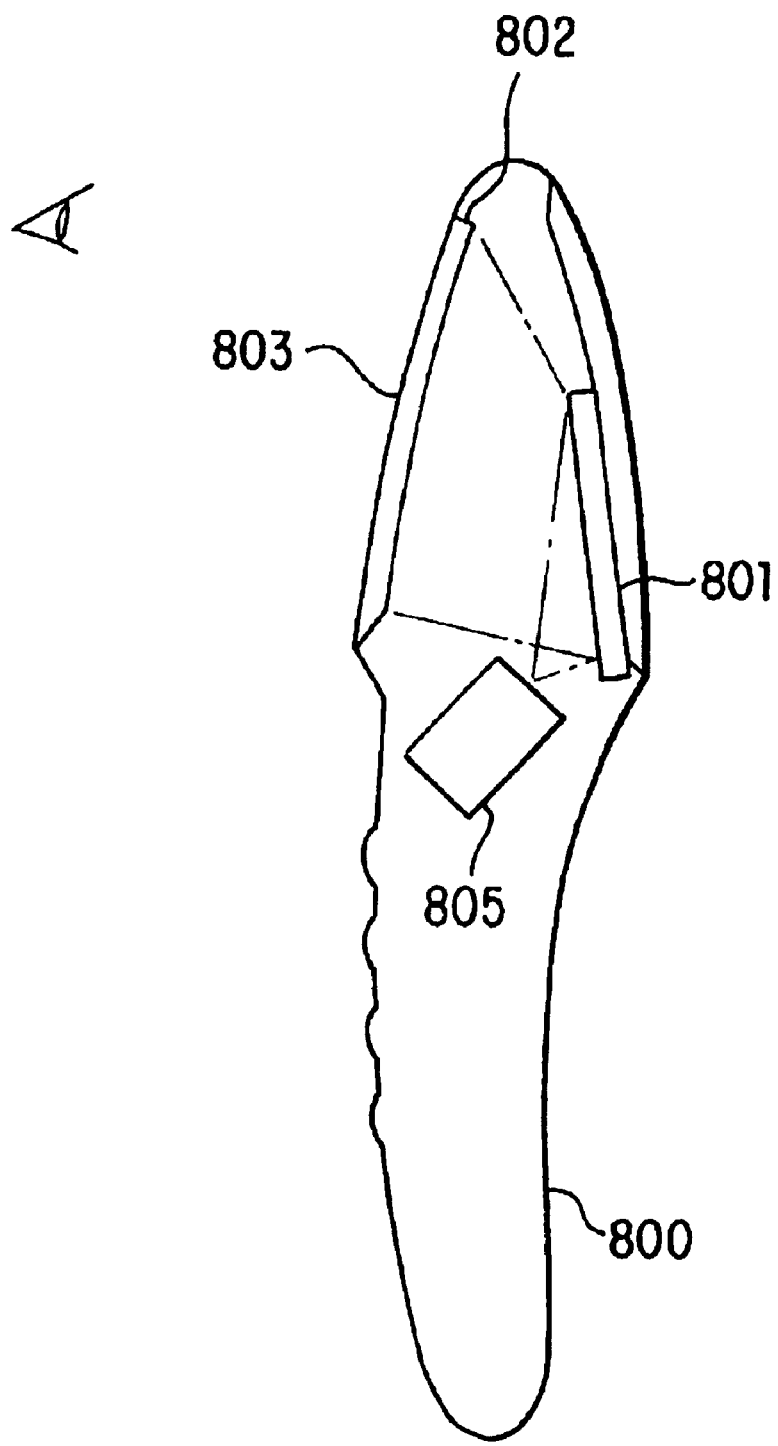
FIG. 8a is a side view of another portable instrument with a closed display panel.

Turing next to FIGS. 8a, b, c, there is depicted another embodiment of an instrument in which a laser display module may be embedded.

FIG. 8a is a side view of a portable instrument 800 in a first mode of operation in which the laser projection display beams from the module 805 is reflected off an internal mirror 801 and then onto the rear surface of a screen 802, permitting the image to be viewed on the front surface 803 of the screen 802.

Figure 8B:
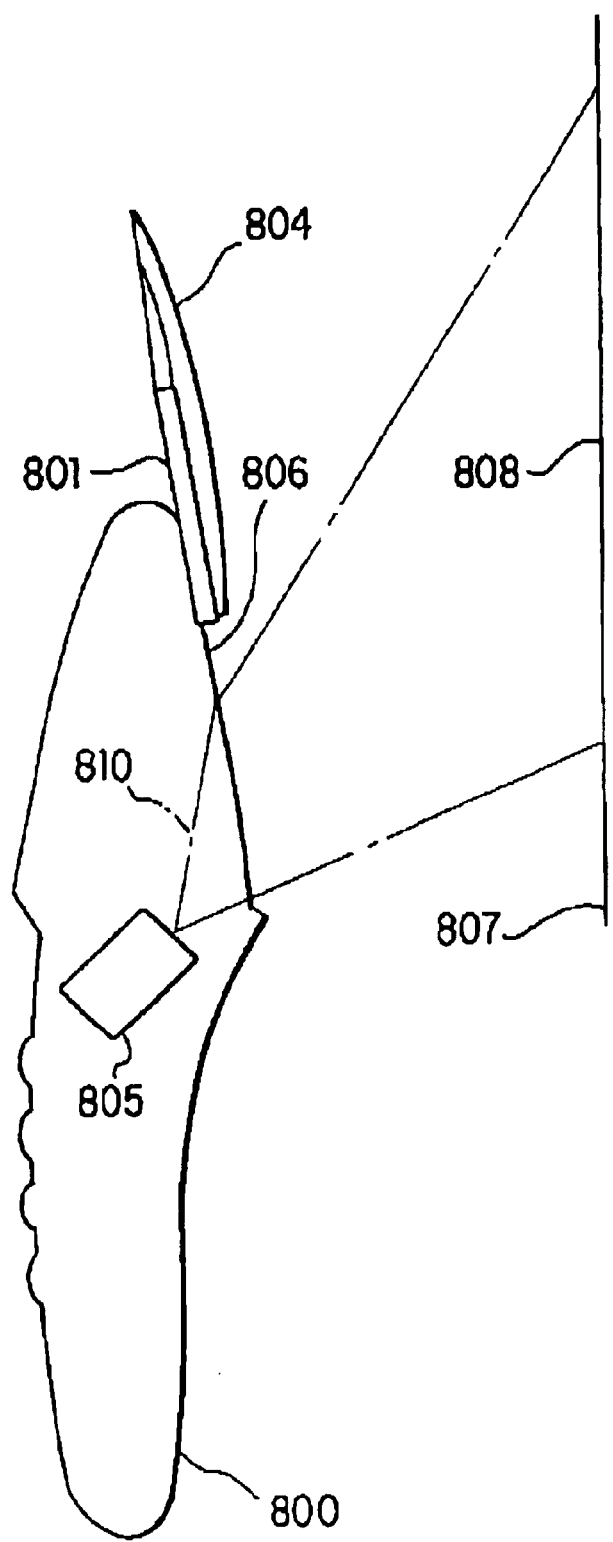
FIG. 8b is a side view of the instrument of FIG. 8a with an open display panel.

FIG. 8b is a side view of the instrument 800 of FIG. 8a in a second mode of operation in which a panel 804, on which the mirror 801 is disposed, is moved out of the path of the projected beams 810 from the module 805 allowing the beams 810 to traverse a window 806 in the rear portion of the housing of instrument 800, and project an image 808 on a remote surface or screen 807.

Figure 8C:
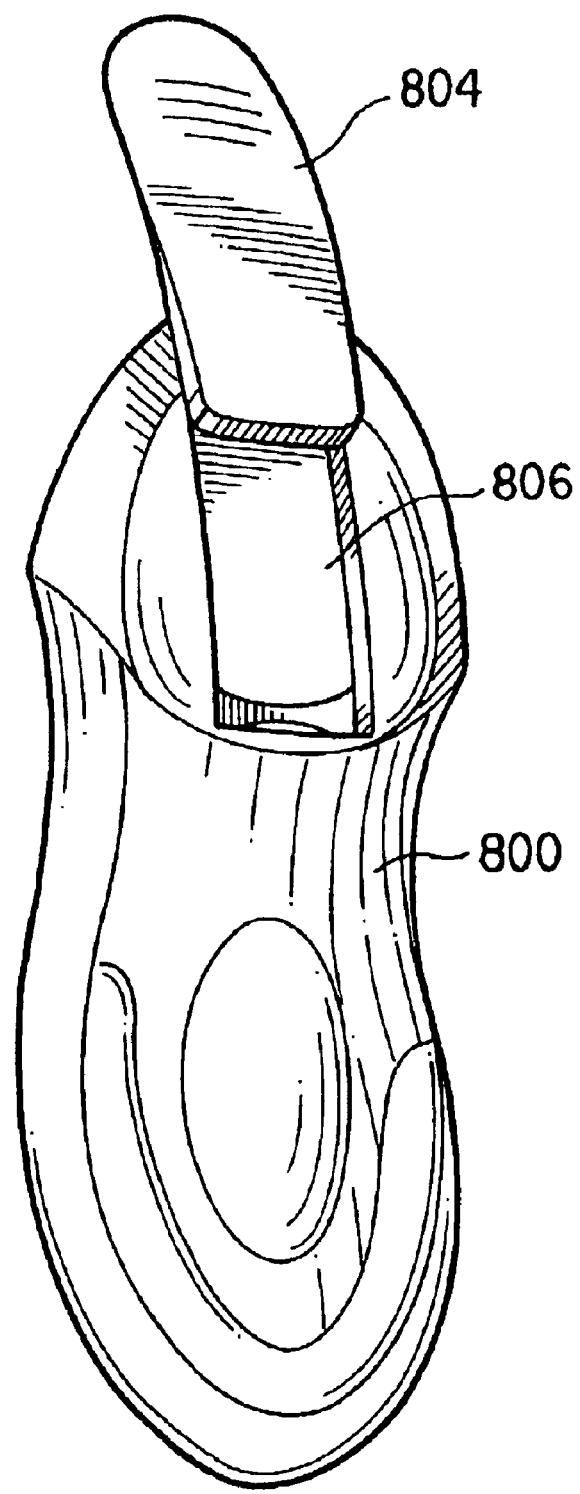
FIG. 8c is a perspective view of the instrument of FIG. 8b.

FIG. 8c is a rear view of the instrument 800 depicted in FIG. 8b showing the opening of the panel 804, and the window 806.

In another embodiment, the screen 802 may be incorporated into the movable panel 804.

Figure 9:
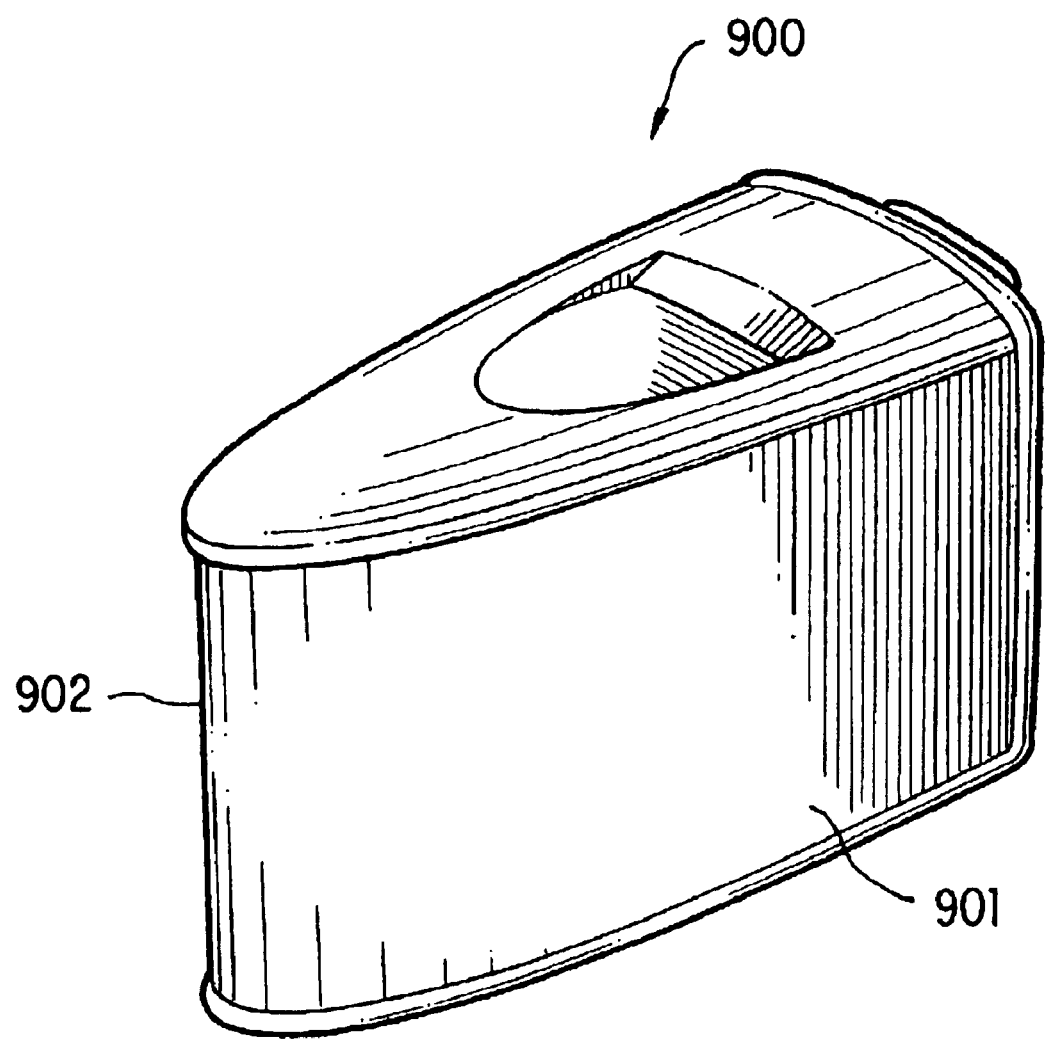
FIG. 9 is a perspective view of still another display instrument in a fixed mount embodiment.

FIG. 9 is a perspective view of a laser projection display 900 suitable for a stationary mount, such as on a pole or shelf. There are preferably two surfaces 901 and 902 which display the same image. Thus, the unit 900 is particularly suitable for a sign in which information is presented in two directions.

The display of the instrument of FIGS. 1–5 can be automatically powered up when the screen is moved to the open position. The instrument 400 is battery-powered and portable and able to fit in one's pocket. The horizontal scan rate is preferably equal to or greater than 10 kHz to average or correlate the scanned data in order to average out the noise as well as to make the scanning more aggressive.

Horizontal distortion may be reduced by varying the spacing between pixels to match the movement of the scan mirrors. Vertical distortion may be reduced by blanking the top and bottom scan lines in the image, and by reducing display brightness and resolution. Brightness distortion can be reduced by changing laser power as a function of scan speed. A color filter can be associated or integrated with the screen 408 to improve contrast. Brightness compensation can be obtained by using a sensing element to detect ambient light.

Power consumption by the laser is estimated at 20–30mw, whereas the power consumed by each scan mirror is less than 5mw. This compares favorably to backlit LED displays. Power consumption can be reduced by projecting the image only when a trigger is depressed, or only when the sensing element indicates that the ambient light is below a threshold level.

A reflective or light-sensitive stylus can be detected on the front surface of the screen, thereby enabling this device to not only be used as a display screen, but also to be used as a touch screen. The stylus may have a pen shape terminating in a retro-reflective tip so that the position of the tip is readable by the display for the purpose of moving a cursor or selecting a projected icon.

The size of the projected display is a function of the angle through which the Y-scan mirror is moved, as well as the distance of the viewing surface from the instrument. In the preferred embodiment, four display lines of approximately equal length to constitute a rectangular display are generated. An on-board range finder can be employed to determine the distance between the instrument and the viewing surface, and to automatically control the angle through which the Y-scan mirror is moved. The user can also manually select the image size, for example, by moving a slide switch to a predetermined position in order to control the mirror angle and, in turn, the image size of the display.

The size of the displayed image in FIG. 1 is greater than the size of the module within the instrument 400. The image is focus-free and is readable over a wide range, for example, from a few inches to infinity. No re-focusing of optics is needed to view the image at different distances relative to the instrument. This focus-free feature is obtained by having the laser beam cross-section or beam spot diverge at a rate equal to or smaller than the scan angle divided by the pixel resolution member. The size of the image is proportional to the viewing/projection distance away from the instrument.

The frame rate is optimized for a chosen display resolution. For example, 50 Hz is optimized for a display with 160-line resolution. A frame rate below 40 Hz may cause flashing. The display will start losing lines when the frame rate is above 70 Hz.

The display can constitute video images, live television or streaming video, a sign, a bulletin board, or in short, any image.

Additional features of the electro-optical assembly include conserving power by only activating the laser during part of the scan, conserving power by reducing laser power where the ambient light is dim and by increasing laser power when the ambient light is bright, minimizing friction by supporting the X-scan mirror by sleeve or jewel bearings and by supporting the Y-scan mirror by torsion hinges or magnetic springs, adding fold mirrors to obtain more than one line per scan, driving the Y-scan mirror at variable speed to compensate for projection distortion, driving the Y-scan mirror at constant speed and using an additional lens to compensate for projection distortion, configuring the Y-scan mirror as a polygon with curved mirror facets that compensate for projection distortion, driving the Y-scan mirror at a constant speed while driving the X-scan mirror at a variable speed to compensate for projection distortion, driving both X-scscan and Y-scan mirrors at variable speeds to compensate for projection distortion, driving the Y-scan mirror at a wide scan angle for best compensation of projection distortion, and interlacing the scan lines produced by the Y-scan mirror.

Brightness compensation is obtained by varying the laser power within each frame. When the laser power is constant throughout the frame, the display is brighter toward the end of each scan line as the scanner slows down, and is dimmer in the center of each scan line as the scanner speeds up. To display an image having the same brightness throughout the frame, the laser power is adjusted as a function of the laser spot speed.

The different types of distortions which must be compensated include the laser spot (pixel) aspect ratio due to a non-linear scan speed profile, brightness distortion due to brighter and darker areas within the display area due to variable scanner speeds, and large scan angle distortion.

Still other features of the electro-optical assembly include driving the Y-scan mirror by a cam or crankshaft, configuring the screen with a filter transparent to laser light but opaque to ambient light, configuring the screen as a holographic diffusing element for a uniform viewing angle, configuring the screen as an optical touch screen where the position of a stylus on the screen is determined by the time that the laser beam reaches the stylus, configuring the stylus as a reflective element and positioning a photodetector behind the screen, configuring the stylus with a built-in photodetector and battery, configuring the stylus for wired or wireless operation, capturing an image with an additional photodetector placed behind the screen, and printing on thermal paper placed behind the screen.

The miniature size of the electro-optical assembly enables it to be mounted in many different kinds of housings, especially those where space is already at a premium. Thus, a cellular telephone can be internally provided with the assembly to project an image on a cover. A pen, wand, or key chain can likewise contain the assembly and project any display. Even larger housings, such as a toy or desktop computer, can be equipped with the assembly. Any device whose use is enhanced by displaying information may employ the assembly to good advantage.

Where the device is a bar code symbol reader as described above, the display can be employed to visually advise a user of the status of the symbol reading. For example, the laser beam can be turned on and off during specified scans to form a human-readable message, such as "too far" or "too near" to advise the user that the reader is too far or near the symbol to be read. Other messages may include "tilted", "specular" or the like to advise the user that there is a problem with the reading. The message could also indicate that the reading was successful. Thus, the display serves as a feedback device to the user.

It will be understood that each of the elements described above, or two or more together, also may find a usefill application in other types of constructions differing from the types described above.

For example, the X-scan and Y-scan mirrors can be implemented as an array of miniature mirrors of the type used in video projection systems and in high definition television and known as a microelectromechanical system (MEMS). The entire array can be broadly illuminated by a single laser. Alternatively, the laser can be focused onto the array by a digital optical element that creates an individual laser beam for each mirror, thereby avoiding any loss of light that strikes the array between the mirrors. Each mirror can be moved to illuminate or darken a pixel, as needed.

In order to make a color display, a plurality of lasers of different wavelengths is used to illuminate the array. One laser illuminates the array at a time. The lasers are activated in rapid succession. Currently, only red and blue lasers are commercially available. A green laser is not yet on the market. Hence, the color display is not a full color, but instead, is a reduced color image. Beam splitters may be employed to make the optical paths coaxial to avoid loss of convergence with changes in distance relative to the viewing surface, or the lasers may be placed close together to avoid significant parallax errors. Preferably, the resolution of the MEMS array is 160×160 pixels, which is similar to that achieved in personal digital assistants.

A 160×160 array of VCSELs could also be used. Even if all the pixels had to be simultaneously illuminated, it is not necessary to energize all the lasers at once. The array of lasers can be rapidly scanned, illuminating only as many at one time as can be accommodated by an available power supply.

A display could also be made by mechanically scanning a single line array of 160 lasers, all aimed at a moving mirror that reciprocally scans the entire array. Alternately, the entire array can be moved. To minimize power consumption, smaller groups of the lasers are energized at one time. A single scan mirror can be oscillated in two mutually orthogonal directions, as opposed to moving two mirrors in two respective directions.

A color display can be built by scanning three linear arrays of lasers simultaneously, with different color lasers in each array. A single mirror can scan all three arrays, or all three arrays can be moved together.

Other than moving a mirror and/or a light source, other scan mechanisms include rotating a mirrored polygon, moving a lens or other optical element, or a non-mechanical beam deflector such as an acousto-optical system or an electrically controlled grating. Each sweep along the X-axis need not be linear. A non-raster type display is also contemplated As described above, the X-axis rate of scanning is higher than for the Y-axis. The assembly can be turned 90° so that the Y-axis rate of scanning is higher along the vertical direction.

This invention is not intended to be limited to rear projection, and is expressly intended to include front projection where the light source is on the viewing side or front surface of a built-in screen, and the screen preferably has a reflective/diffusive property on its rear surface.

While the invention has been illustrated and described as embodied in an electro-optical assembly for image projection, especially in hand-held or wearable instruments, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for displaying an image for viewing by a human eye, comprising:
   a) a housing having a screen which has a rear surface;
   b) an energizable laser supported by the housing for projecting a laser beam toward the rear surface of the screen when energized;
   c) a scanner supported by the housing for sweeping the laser beam along a plurality of light paths either over the rear surface of the screen, or to a remote surface; and
   d) a controller supported by the housing and operatively connected to, and operative for energizing, the laser at selected positions of the laser beam in at least one of the light paths to generate individual light pixels at the selected positions, and at a refresh rate at which the pixels persist to enable the eye to steadily view the image comprised of a light pattern of the pixels on the screen or the remote surface.

2. A user-supported, personal pocket appliance for displaying information, comprising:
   a) a housing having a display panel which has a surface;
   b) an energizable laser in the housing for projecting a laser beam toward the display panel when energized;
   c) a scanner in the housing for sweeping the laser beam along a plurality of light paths either over the surface of the display panel or to a remote surface; and
   d) a controller in the housing operatively connected to, and operative for energizing, the laser at selected positions of the laser beam in at least one of the light paths to generate individual light pixels at the selected positions on the display panel or the remote surface, and at a refresh rate at which the pixels persist to enable a human eye to steadily view the image comprised of a light pattern of the pixels on the surface of the display panel or the remote surface.

3. An arrangement for displaying an image for viewing by a human eye, comprising:
   a) a first screen and a second screen spaced apart of each other;
   b) an energizable laser for projecting a laser beam toward the screens when energized;
   c) a scanner for sweeping the laser beam along a plurality of light paths over the screens; and
   d) a controller operatively connected to, and operative for energizing, the laser at selected positions of the laser beam in at least one of the light paths to generate individual light pixels at the selected positions, and at a refresh rate at which the pixels persist to enable the eye to steadily view the identical image comprised of a light pattern of the pixels on each of the screens.

4. A scanning module for scanning a light beam, comprising:
   a) a support;
   b) a generally planar, elongated flexure having one end region connected to the support, and an opposite end region;
   c) an actuation element including a scan mirror connected to the opposite end region of the flexure, and operative for reflecting the light beam;
   d) a soft magnetic material member attached to the actuation element;
   e) first and second magnets disposed on opposite sides of the member for inducing a magnetic field in said member; and
   f) an actuatable electromagnetic drive for exerting a force upon the member and for moving the member, the actuation element and the scan mirror so as to scan the light beams across a target.

5. A scanning component for scanning a light beam, comprising:
   a) a movable scan mirror for reflecting the light beam;
   b) a magnetizable member mounted to the scan mirror for joint movement therewith;
   c) a magnetic structure adjacent the magnetizable member for inducing a static magnetic field in, and for magnetizing, the magnetizable member; and
   d) an actuatable electromagnetic drive for creating a variable magnetic field that interacts with the static field for exerting a force upon the member and for moving the member and the scan mirror so as to scan the light beam across a target.

6. A scanning module for generating a scanning light beam, comprising:
   a) a support;
   b) a generally planar, elongated flexure having one end region connected to the support, and an opposite end region;
   c) an actuation element including a scan mirror connected to the opposite end region of the flexure;
   d) a soft magnetic material member attached to the actuation element;
   e) first and second magnets disposed on opposite sides of the member for inducing a magnetic field in said member; and
   f) an actuatable electromagnetic drive for exerting a force upon the member and for moving the member and the scan mirror so as to scan the light beam across a target.

7. An arrangement for displaying an image for viewing by a human eye, comprising:
   a) a housing having a screen and a panel mounted for movement between first and second position;
   b) an energizable laser supported by the housing for projecting a laser beam toward the panel when energized;
   c) a scanner supported by the housing for sweeping the laser beam along a plurality of light paths over the screen in the first position of the panel, and over a remote viewing surface in the second position of the panel; and
   d) a controller supported by the housing and operatively connected to, and operative for energizing, the laser at selected positions of the laser beam in at least one of the light paths to generate individual light pixels at the selected positions, and at a refresh rate at which the pixels persist to enable the eye to steadily view the image comprised of a light pattern of the pixels on the screen in the first position, and on the remote viewing surface in the second position.

8. An arrangement for displaying an image for viewing by a human eye, comprising:

a) a housing having two screens facing in different directions;

b) an energizable laser supported by the housing for projecting a laser beam toward the screens when energized;

c) a scanner supported by the housing for sweeping the laser beam along a plurality of light paths over both screens; and d) a controller supported by the housing and operatively connected to, and operative for energizing, the laser at selected positions of the laser beam in at least one of the light paths to generate individual light pixels at the selected positions, and at a refresh rate at which the pixels persist to enable the eye to steadily view the image comprised of a light pattern of the pixels on both screens for viewing in either of said directions.

* * * * *